United States Patent Office 3,475,398
Patented Oct. 28, 1969

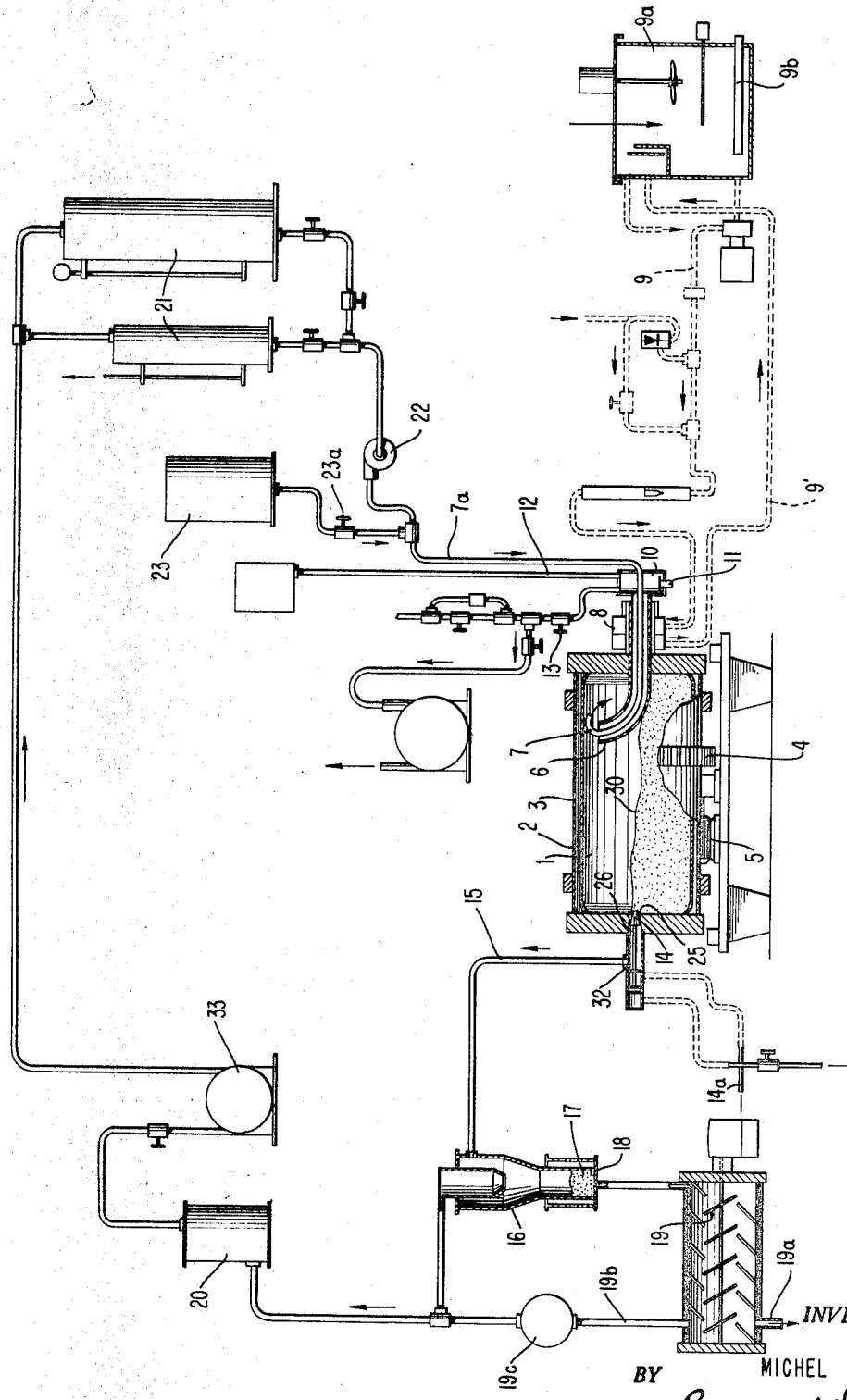

3,475,398
CONTINUOUS POLYMERIZATION IN MASS
Michel Jobard, Versailles, Yvelines, France, assignor to Compagnie de Saint-Gobain, Neuilly-sur-Seine, France
Filed Apr. 11, 1961, Ser. No. 102,233
Claims priority, application France, Apr. 11, 1960, 824,013
Int. Cl. C08f 1/04, 1/06, 3/30
U.S. Cl. 260—92.8
4 Claims This invention involves a process for the continuous polymerization of monomers whose polymers or copolymers are insoluble in the monomers. It is particularly related to polymerization in mass, that is to say in the absence of solvents or diluents. In the polymerization or copolymerization in mass of monomers batch processes have been largely used heretofore for lack of a satisfactory continuous process. The discontinuous process was not readily turned into a continuous process because of difficulties relating to the degree of polymerization to be attained; a principle difficulty, particularly in relation to the processes which are carried out under super-atmospheric pressure, is the problem of removing solids continuously from a reaction vessel containing liquids and sometimes gases.

Up to a certain level of polymerization of these monomers, variable according to the nature of the monomers, the polymer could be maintained in suspension in the liquid monomer by agitation of the mass in the polymerization vessel. The evacuation of these polymers from the polymerization vessel could then be accomplished easily by means normally used for the evacuation of liquids but the amount of polymerization corresponding to such conditions is generally very low and necessarily requires the recycling of such large quantities of monomer that it removes those processes from industrial application.

Above those low yields of polymerization the liquid monomer is absorbed by the polymer and swells it so that the phase constituted by the liquid monomer tends to decrease as the polymerization yield increases until there is no longer in the polymerization mass any liquid but only solid polymer swollen by monomer and some monomer in vapor state which fills the vessel and impregnates the polymer.

In the case of vinyl chloride, which is a gas at ordinary temperature and is ordinarily put under sufficient pressure to liquefy it before polymerization, the degree of polymerization above which the phase formed by liquid monomer disappears is situated between about 15 and 20% by weight of polymer with respect to the weight of the reaction mass. Inasmuch as polyvinyl chloride is an important commercial material and as the difficulties of the prior art find themselves concentrated in the process by which it is made, this specification will proceed with a description of the invention as applied to the manufacture of polyvinyl chloride. Polymerization of this monomer is carried out in an autoclave.

Inside the autoclave there is relatively high pressure, equal to the vapor tension of the monomer at the temperature of polymerization adopted. The evacuation of the products of polymerization from the autoclave is very difficult because these products constitute a polymer powder swollen with monomer, the particles of which have a strong tendency to form agglomerates during evacuation. It has been attempted to avoid that difficulty by using a screw conveyor or to keep the reaction mixture a long time in a long tube through which it moves, but it has not been possible in this way to avoid a more or less rapid constriction of the system of evacuation employed.

The present invention has for its objects a method of continuously polymerizing monomers in mass whose polymers or copolymers are insoluble in the monomers and to overcome the various difficulties which have been briefly discussed hereinabove. Another object is to polymerize polyvinyl chloride, alone or with compatible monomers continuously and to provide means for substantially continuous evacuation of product, equalling the formation of product from any monomer, while maintaining satisfactory conditions of polymerization, of temperature, pressure and catalysis inside the autoclave at all times, and the production of a polymeric product equal or superior to that which is produced by batch methods.

The objects of the invention are accomplished, generally speaking, by a method of making polyvinyl chloride continuously which comprises establishing within an enclosure conditions of temperature and pressure favorable to the polymerization of vinyl chloride, establishing therein a body of granular polyvinyl chloride impregnated with vinyl chloride, flowing monomer into said enclosure at a rate which maintains the granular polyvinyl chloride at a substantially constant level, and discharging polymer intermittently from the enclosure below the level of the polymer in units small in volume compared to the size of the enclosure and during times so brief that the conditions of polymerization in the enclosure are not harmfully affected.

The process according to the invention is of the type in which the degree of polymerization is so high that the liquid monomer phase substantially disappears by absorption in the grains of polymer so that the product of polymerization is substantially composed of solid polymer swollen by liquid monomer and by saturation with monomer vapor. The invention is also useful in cases where the liquid monomer is still present as such but is not in a position to be discharged from the outlet of the autoclave simultaneously with the polymer grains.

An important characteristic of the invention is that the removal of the polymer grains from the autoclave, swollen with monomer, is carried out through an orifice directly connected with the interior of the autoclave on one side and with apparatus for degassing the polymer so as to rid it of absorbed gaseous monomer, and to apparatus for isolating monomer and polymer. This orifice is intermittently opened, remaining open momentarily, and is immediately closed, these openings being repeated frequently enough to discharge units of polymer whose total is substantially equal to the new polymer which is being formed in the autoclave from inflowing monomers. The size of the orifice is so small, compared to the size of the autoclave and the discharge opening is open for so short a time that, while the pressure inside forces the monomer powder through the opening, the pressure never falls below a satisfactory polymerization level. There is some fluctuation of pressure in the autoclave as the discharge opening is opened and closed, which all occurs at a pressure level at which polymerization proceeds satisfactorily. The smaller the discharge opening, the slower the drop in pressure as the polymer is forced through it.

I have discovered that when one chooses a degree of polymerization between useful operating limits, which are to be determined for each monomer, the release of gas from the swollen polymer, as it issues from the autoclave, imparts to the polymer the kinetic energy to propel it out of the autoclave through the discharge opening and into a cyclone, in which the grains of polymer are separated from residual monomer.

In the case of vinyl chloride for example, the useful degrees of polymerization are situated between those in which all the liquid monomer is absorbed by the polymer (15 to 20%) and that degree of polymerization at which, in a discontinuous operation, the pressure beings to fall (80 to 85%), the gaseous monomer then losing the characteristic of a saturating vapor. Between the degrees of polymerization thus defined the quantity of monomer absorbed by the polymer and, consequently, the energy available during the evacuation of the polymer are higher for the degrees of polymerization which are relatively low and diminish as the degrees of polymerization increase.

It follows from the foregoing that in order to carry out operations with industrially acceptable yields, it is preferable to adopt degrees of polymerization as high as possible, these degrees being limited only by the conditions, conforming to the invention, which provide for the discharge of polymer. Practically, in the case of vinyl chloride degrees of polymerization between 35 and 70% are perfectly satisfactory and provide for ready evacuation of the polymer formed.

After their discharge from the autoclave, the products are no longer subjected to its internal pressure and a part of the liquid monomer formerly held in the polymer becomes gaseous and its escape furnishes a substantial volume of gas which tends to escape toward the zone of lower pressure, outside the autoclave. The granules of polymer are dispersed in this volume of gas and are entrained with it and carried out of the autoclave. As zones where the pressure is yet lower are reached the further fraction of liquid monomer vaporizes out of the polymer and augments the volume of gas as it moves away from the autoclave. This has two important advantages. First, the polymer powder is driven from the discharge port of the autoclave to a place which may be very far from the autoclave and second, the polymer grains dispersed in the gas have a tendency to move away from each other as the monomer escapes from them so that agglomeration and the formation of crusts is avoided.

The drawings constitute a diagrammatic showing of an appaartus adapted to the continuous polymerization of vinyl chloride. The autoclave 1 encloses a space in which the polymerization takes place. It is a horizontal cylinder made of stainless steel rotatable around a horizontal axis. It has flat heads and a cylinder wall 2 about which is disposed a jacket 3 internally provided with baffles, through which one may circulate water or other fluid for temperature control. The autoclave is mounted on bearings 4 and is rotated by a motor 5 at a speed which may conveniently be between 10 and 60 revolutions per minute. The autoclave contains stainless steel balls coated with lead which serve, by rolling along the bottom as the cylinder turns to maintain the polyvinyl chloride in fluidified condition. Water for the water jacket is supplied by a heater 9a the temperature of which is controlled by a thermostat 9b, which delivers water to the jacket through pipe 9 and chamber 8 and receives it back after flowing through the jacket through pipe 9'. As apparatus for maintaining a selected temperature in a water jacket is known, it needs no further description.

Reservoirs 21 contain pure vinyl chloride monomer which is delivered in measured quantity by pump 22 through conduit 7a and the axis of the autoclave by pipe 7 into the interior of the autoclave above the level 30 of the polymer. The pipe 7 is turned at its discharge end toward the bottom of the autoclave in order to prevent the formation of crusts on the pipe by the collection of catalyst on its walls and to improve the homogeneity of the mixture. About the tube 7 is a pipe 6 which also enters by the axis of the autoclave and and which points upwardly and which may or may not be sealed by a safety disc at its inner end 11 capable of rupturing if the internal pressure of the autoclave becomes dangerous. The orifices of pipes 6 and 7 are always mounted in the position shown and above the level of the polymer in the autoclave. Outside the autoclave the pipe 6 is connected to a chamber 10 which has safety valves 11 and is connected to a manometer by pipe 12. The manometer is connected electrically to a valve 13 which relieves the pressure in the autoclave if needed. This structure is novel but is not a part of this invention. Thus, the new monomer is delivered toward the righthand end of the cylinder and is given ample opportunity to complete its polymerization before it moves along the cylinder and reaches the lefthand end as a polymer impregnated with liquid monomer.

The reservoir 23 through valve 23a delivers catalyst in a measured amount to the monomer which is delivered through tube 7a. The proportions of catalyst and its nature are not a novel part of this invention but may conform to the prior art.

The apparatus which has just been described supplies the autoclave with monomer at a selected rate, maintains the internal temperature and pressure of the monomer at those which are adapted to efficient polymerization and provides for security and scavenging of the autoclave when necessary or desirable.

At the other end of the autoclave is mounted the apparatus which is properly a novel part of this invention and which involves an aperture 25 in the wall of the autoclave in alignment with its axis and beneath the level of polymer which is consistently maintained in the autoclave. This opening 25 is controlled by a valve 14 which is intermittently and momentarily opened, either manually in accordance with a selected time schedule or preferably with an automatic timing mechanism which is diagrammatically indicated at 14a as being of pneumatic type. The valve 14 connects with a space 26 within a chamber 32 which is maintained at a pressure well below that within the autoclave and which is low enough to permit the rapid vaporization of the liquid monomer which is absorbed by the grains of polymer. The valve directly connects the interior of the autoclave with the chamber 32 and the conduit 15 which receives the products of polymerization which are discharged from the autoclave and transports them to a cyclone 16 which separates the solids 17 from the gases which follow the arrow towards receptacle 20 in which the gaseous monomer is finally separated from the solids and passed to a reservoir 33 from whence it may be forwarded to reservoir 21 for reuse. The valve opens periodically and momentarily so that a quantity of polymer, small compared to the amount in the autoclave, is discharged into the space 26. The space 26 serves as a decompression chamber for the products of polymerization which are discharged from the autoclave.

The discharge from the autoclave is facilitated by the fact that the pressure inside the autoclave is greater than that in the space 26 and by the additional and exceptionally important fact that the pressure in the autoclave immediately adjacent the valve 25 drops rapidly as the valve is opened so that the liquid monomer in the polymer grains vaporizes, flows toward the space 26 of lower pressure and carries the polymer with it. As the valve opens only momentarily, usually for less than a second, the general pressure within the autoclave does not drop sufficiently to harmfully affect the polymerization which is proceeding within or to create any great difference of pressure except in the immediate vicinity of the valve and the quick closing of the valve quickly restores the pressure in that location while the rotation of the apparatus restores the level of the polymer in that location. The polymer discharged from the autoclave into the space 26 travels through conduit 15 into cyclone 16 where the polymer, still humid, is separated from the monomer and received at the base of the cyclone in the receptacle 18 from whence it is directed toward the mechanical drying apparatus 19. This drier is constituted by a cylindrical fixed wall which has a heating jacket and a ribbon blender agitator. The polymer while being agitated moves through the drier to the discharge orifices 19a where it is discharged in a dry state. The monomer still in the humid polymer before the drying, vaporizes in the drier, which is maintained under a partial vacuum and is drawn off toward a receptacle 20 through a pipe 19b and a ventilator 19c. The monomer received in receptacle 20 is cleaned of dust and condensed before being sent to the reservoir 21.

The catalyst reservoir 23 is maintained in a cold bath. In the examples which follow this contained a 17% solution of catalyst dissolved in monomer and kept under an atmosphere of nitrogen of 10 kg. pressure. The valve 23a permits the supply of catalyst to the autoclave either continuously or intermittently so as to control the process at will by controlling the content of catalyst in the mixture.

The following examples show the continuous production of polyvinyl chloride by the polymerization of vinyl chloride in mass in an apparatus similar to that hereinabove described. These examples set forth the same operating conditions, the conditions which establish continuous operation, the results obtained and the qualities of the products. They also permit the comparison of the new resins and the comparison of the results obtained by different operating conditions and a comparison of their properties.

In Examples 1 and 2, for instance, for the same hourly input of pure monomer, but for different concentrations of catalyst there are produced different degrees of polymerization and there has been established the existence of improved granulometry, of apparent density, and a reduction of the content of low polymers, compared to known prior art processes.

Example 1

Operating conditions: The polymerization is made in a rotating autoclave of 34 liters volume, agitated by balls of which 10 are of 80 mm. diameter and 10 of 60 mm. diameter. The speed of rotation of the autoclave is 20 revolutions per minute. The reaction temperature is 60° C. which establishes a pressure in the autoclave of 9 kg./cm.$^2$. About 14 kg. of the reaction mass is maintained in the autoclave at all times. The catalyst employed is bis-azo-isobutyronitrile. The discharge valve is operated every 5 minutes, opening 4 times for every discharge, and remaining open for about 0.5 second each time.

The following tests A, B and C were carried out to compare the results using different concentrations of catalyst:

| | A | B | C |
|---|---|---|---|
| Hourly input of monomer, g | 1,500 | 1,500 | 1,500 |
| Catalyst concentration in monomer, percent | 0.015 | 0.03 | 0.045 |
| Degree of transformation to polymer, percent | 38 | 50 | 65 |
| Properties of Polymer Form: | | | |
| K wert | 64.6 | 64.4 | 64.6 |
| Granulometry measured by the percent which passes through an AFNOR No. 24 screen | 93 | 95 | 99 |
| Apparent density | 0.46 | 0.57 | 0.61 |
| Index of low monomers | 3.3 | 3.5 | 2.9 |
| Monomer content after the cyclone in percent by weight | 15 | 13 | 10 |

Example 2

The conditions were substantially the same as in Example 1. The monomer input was increased and the percent content of catalyst was increased.

| | D | E |
|---|---|---|
| Hourly input of monomer, g | 2,750 | 2,750 |
| Catalyst concentration as percent by weight of the monomer | 0.06 | 0.09 |
| Degree of transformation, percent | 35 | 52 |
| Properties of Polymer Form: | | |
| K wert | 64 | 64.2 |
| Granulometry measured by the percent which passes through an AFNOR No. 24 screen | 94 | 95 |
| Apparent density | 0.45 | 0.6 |
| Index of low monomers | 3.7 | 3.8 |
| Monomer content after the cyclone in percent by weight | 15 | 12 |

Example 3

This example concerns two continuous polymerizations in mass effectuated in a fixed autoclave of 500 liters agitated by a ribbon blender turning at 30 revolutions per minute. The temperature was kept at 62° C. and the pressure at 9.5 kg./cm.$^2$. The autoclave was kept 50% full (by volume). The catalyst was the same as in Example 1 and the discharge valve opened one-half second every minute.

| | F | G |
|---|---|---|
| Hourly input of monomer, kg | 25 | 35 |
| Percent concentration of catalyst in the monomer, by weight | 0.03 | 0.03 |
| Percent transformation to polymer | 50 | 40 |
| Hourly production of polymer, kg | 12.5 | 14 |
| Properties of the Polymer Formed: | | |
| K wert | 63 | 63.2 |
| Granulometry measured as a percent passing a screen having apertures of 250 μ | 92 | 80 |
| Apparent density | 0.45 | 0.40 |
| Index of low polymers | 3.4 | 3.8 |

In the evacuation of the polymer swollen by the monomer one may use any means which rapidly opens and hermetically seals the discharge orifice of the polymerization space and which is capable of permitting the ready passage of a powdery product under pressure through an orifice of small section. One may advantageously use a pointed valve pneumatically controlled. The internal profile of the valve is chosen so that the losses of pressure are reduced if possible between the portion situated near the polymerization space and the connection with the conduit which carries the polymer away, so that the residual pressure of the monomer ejected through the orifice decreases progressively as the polymer moves away from the polymerization space.

The discharge apparatus is so located that the orifice is always below the level of the polymer powder in the polymerization space so that the gaseous monomer is prevented by the polymer from passing through the discharge orifice except to the extent that it is occluded in the polymer itself.

The discharge orifice is intermittently opened for very short periods, the total period of opening during a unit of time being regulated in accordance with the conditions of polymerization and particularly in relation to the rate at which monomer is injected into the polymerization space so that there will not be any general lessening of the pressure existing in the polymerization space and no reduction of the degree of polymerization or of the content of polymer by reason of an excess of monomer. To be specific, the discharge orifice may be opened several seconds in each minute for an industrial autoclave having a capacity of a cubic meter or even several seconds per hour if the autoclave is smaller and contains only several tens of liters.

The apparatus already known for the polymerization in mass by batch methods are generally useful when modified in accordance with this invention. For instance autoclaves having vertical axes and agitators operating vertically or horizontal autoclaves having a system of agitation capable of maintaining the polymer powder in fluidified condition, horizontal autoclaves containing rollers and turning about their horizontal axis and horizontal autoclaves which are fixed and agitated by helical blades are particularly useful.

The polymerization space is provided with apparatus which continuously introduces the monomer and the catalyst at a rate which replaces the polymer which is ejected. When the autoclaves are rotary and have horizontal axes it is advantageous to locate the ports of admission and discharge on the axes at opposite ends. The separation of monomer and polymer is carried out at the discharge end of the apparatus in any convenient way such as by a cyclone or a continuous separator involving mechanical agitation. Known driers are useful in handling the moist polymer. The monomers are freed of entrained dust and used again with or without compression or liquefaction.

The process of the invention is applicable to the polymerization of monomers of vinyl chloride, vinyl fluoride, vinylidine chloride, acrylic nitrile either alone, in admixture with each other, or in admixture with other polymerizable derivatives of ethylene or ethylene itself. The percent of polymerization that is useful while operating continuously depends, for each monomer or mixture, in practice on the temperature at which they are normally polymerized taking into consideration the influence of given catalysts, when used, and the vapor tension at that temperature. Experience has shown that for monomers responding to the foregoing characteristics one may adopt percentages of polymerization which are generally acceptable industrially.

The process as described has many advantages, particularly that it permits one to obtain the maximum possible benefit from continuous operation. In particular it permits one to adopt and maintain optimum conditions of operation, which cannot be maintained by discontinuous methods. For example, it is possible to change the different factors such as content of catalyst, temperature and pressure, during operation, without interrupting the operation, and without entraining a diminution in the efficiency of the operation. During operation one may vary the conditions upon which the success of the operation depends such as temperature, quantity of polymerization mass in the autoclave, speed of rotation, nature and concentration of catalysts, time of residence in the polymerization space and to preserve each of these conditions as much as is necessary to the production of a perfect product. Thus one is able to obtain better conditions of regularity, products having different qualities, color homogeneity, uniformity of reproduction of polymers having particular properties.

The applicant has found, in particular, that by the continuous polymerization in mass which is accomplished by this invention it is possible to obtain products of better quality than those which can be prepared by polymerization in mass by batch or discontinuous methods. The physical properties, such as mechanical properties, thermal properties and electrical properties are analogous to those properties which are produced discontinuously but the granulometry and the apparent density are substantially improved by the new method and they may be modified at will. The formation of polymer aggregates had already been much reduced by the process of polymerization in mass in batch processes utilizing fluidification of the product but in the present invention the formation of such aggregates is substantially zero. This process eliminates, in effect the period of formation of low polymers and, additionally, the agglomeration of the polymer grains during the time of discharge. In the present process the grains during discharge tend to separate from each other as the occluded liquid monomer vaporizes. Hence the granulometry of the polymers obtained is finer and the grain size is more uniform, for a given degree of polymerization, and this is readily regulated as a function of the structure of the apparatus and its method of use.

The apparent density depends particularly on the composition of the monomer-polymer mixture inside the autoclave and on the mean time of residence in the autoclave; this apparent density reaches and remains at a level which is a function of the composition of the mixture. To stabilize the composition at a desired value and thus to obtain a product of selected and constant quality one may vary the input of pure monomer, the concentration of catalyst, or both and this will modify the weight of the polymer formed in each unit of time. In order to show the advantage of the invention in relation to granulometry and apparent density there are given hereinafter tables based upon the polymerization of vinyl chloride. The polymerization of vinyl chloride continuously in a rotary horizontal autoclave containing a line of rollers produced under the conditions of the invention polymer powders in which the distribution in grain size is indicated in Table I for two percentages of transformation to polymer arbitrarily chosen at 30 and 60%.

TABLE I

| | Screen No. (AFNOR) | | | | | |
|---|---|---|---|---|---|---|
| | 24 | 22 | 20 | 19 | 18 | 17 |
| Percent of grains passing the indicated screens of a product which had undergone 30% polymerization | 92 | 75 | 58 | 42 | 16 | 9 |
| Percent passing the indicated screens from a product of 60% polymerization | 94 | 86 | 77.5 | 65 | 45.5 | 30 |

In Table II there is set forth for polyvinyl chloride, similarly produced, the variations of apparent density and granulometry as a function of the degree of transformation to polymer.

TABLE II

| | Apparent density | Percent of product passing an AFNOR No. 24 screen having apertures of 200 mµ |
|---|---|---|
| Percent of monomer polymerized: | | |
| 20 | 0.315 | 88 |
| 30 | 0.38 | 92 |
| 40 | 0.46 | 92 |
| 50 | 0.60 | 92 |
| 60 | 0.62 | 94 |
| 70 | 0.62 | 95 |
| 80 | 0.62 | 95 |

A supplemental advantage arising from continuous operation as made possible by this invention is that a whole range of degrees of polymerization is provided for. The flexibility of the process is such that a reaction can be made to take place under those conditions of polymerization which produce the maximum polymerization or unit of time, and this results in the maximum use of the productive capacities of each autoclave and is superior to that which can be obtained by batch methods. This has been verified in all stages of transformation up to 80%. In the case of vinyl chloride I have demonstrated that the production of polymer with the continuous method as about 3 or 4 times greater than that which can be obtained by batch methods, taking into account the advantages above-state and also the elimination of dead time relative to filling, discharge, heating, period of induction, etc. In cases where the polymerization proceeds normally at ordinary temperature and pressure the discharge space can be evacuated to establish a difference in pressure sufficient to affect the intermittent ejection of polymer from the autoclave.

As many apparently widely different embodiments of the present invention may be made without departing from the spirit and scope thereof, it is to be understood that the invention is not limited to the specific embodiments.

What is claimed is:

1. The method of polymerizing vinyl chloride in mass which comprises establishing within a pressure vessel conditions of temperature, pressure, and agitation favorable to polymerization, continuously introducing vinyl chloride monomer and a catalyst therefor into the pressure vessel, establishing a degree of polymerization in the polymerization mass, at least about 15%, at which the liquid monomer phase substantially disappears by absorption in the grains of the polymer and the polymerization mass is substantially composed of solid polymer swollen by liquid monomer and monomer vapor, and intermittently discharging from the vessel granular polymer impregnated with monomer and having a degree of polymerization below that at which the gaseous monomer loses the characteristic of a saturated vapor, not substantially over 85%, by intermittently and briefly releasing quantities of polymer from a position beneath the level of the polymerization mass at which liquid monomer is not discharged with the impregnated polymer, utilizing the expansion of the monomer absorbed by the grains of polymer to effect the discharge.

2. The method of claim 1 in which the degree of polymerization of the granular polymer discharged is between 30 and 70%.

3. The method of claim 2 in which the inflow of monomer and the discharge of polymer are balanced to maintain adequate pressure and a substantially constant level of granular polymer in the vessel.

4. The method of claim 1 in which the discharged polymer is separated from its absorbed monomer and both are recovered.

References Cited

UNITED STATES PATENTS

| | | | |
|---|---|---|---|
| 2,664,416 | 12/1953 | Parks | 260—92.8 |
| 2,715,117 | 8/1955 | Baeyaert | 260—92.8 |
| 2,582,899 | 1/1952 | Barnebey | 23—290 |
| 2,614,910 | 10/1952 | Allen et al. | 23—290 |
| 2,762,769 | 9/1956 | Smith | 204—163 |
| 3,102,087 | 8/1963 | Jobard | 204—163 |
| 2,953,551 | 9/1960 | White | 260—92.8 |

JOSEPH L. SCHOFER, Primary Examiner

J. A. DONAHUE, JR., Assistant Examiner

U.S. Cl. X.R.

260—85.5, 87.5, 87.7, 88.7, 91.7, 92.1